US011967455B2

(12) United States Patent
Dong

(10) Patent No.: US 11,967,455 B2
(45) Date of Patent: Apr. 23, 2024

(54) METHOD FOR PREPARING RARE-EARTH PERMANENT MAGNET BY HOT PRESS MOLDING

(71) Applicants: Yuan Dong, Shanxi (CN); Taiyuan Kaiyuan Intelligent Equipment Co., Ltd., Shanxi (CN); Jiangxi Kaiyuan Automatic Equipment Co., Ltd., Jiangxi (CN)

(72) Inventor: Yuan Dong, Shanxi (CN)

(73) Assignees: Yuan Dong, Shanxi (CN); TAIYUAN KAIYUAN INTELLIGENT EQUIPMENT CO., LTD., Shanxi (CN); JIANGXI KAIYUAN AUTOMATIC EQUIPMENT CO., LTD., Jiangxi (CN)

( * ) Notice: Subject to any disclaimer, the term of this patent is extended or adjusted under 35 U.S.C. 154(b) by 474 days.

(21) Appl. No.: 17/299,750

(22) PCT Filed: Dec. 3, 2019

(86) PCT No.: PCT/CN2019/122766
§ 371 (c)(1),
(2) Date: Jun. 3, 2021

(87) PCT Pub. No.: WO2020/114398
PCT Pub. Date: Jun. 11, 2020

(65) Prior Publication Data

US 2021/0383968 A1 Dec. 9, 2021

(30) Foreign Application Priority Data

Dec. 4, 2018 (CN) ........................ 201811471014.6

(51) Int. Cl.

| | |
|---|---|
| ***H01F 41/02*** | (2006.01) |
| ***B22F 3/14*** | (2006.01) |
| ***B22F 3/24*** | (2006.01) |
| ***H01F 1/057*** | (2006.01) |

(52) U.S. Cl.
CPC ............ *H01F 41/0266* (2013.01); *B22F 3/14* (2013.01); *B22F 3/24* (2013.01); *H01F 1/0576* (2013.01); *B22F 2003/248* (2013.01); *B22F 2301/355* (2013.01); *B22F 2998/10* (2013.01)

(58) Field of Classification Search
CPC .................. B22F 1/05; B22F 2003/248; B22F 2009/044; B22F 2201/20; B22F 2202/05; B22F 2301/355; B22F 2301/45; B22F 2998/10; B22F 2999/00; B22F 3/02; B22F 3/14; B22F 3/24; B22F 9/023; B22F 9/04; C22C 2202/02; H01F 1/0572; H01F 1/0573; H01F 1/0576; H01F 41/0266
See application file for complete search history.

(56) References Cited

U.S. PATENT DOCUMENTS

| | | | |
|---|---|---|---|
| 9,845,545 | B2 | 12/2017 | Kuribayashi et al. |
| 10,526,715 | B2 | 1/2020 | Kuribayashi et al. |
| 2015/0233006 | A1 | 8/2015 | Kuribayashi et al. |
| 2018/0044810 | A1 | 2/2018 | Kuribayashi et al. |

FOREIGN PATENT DOCUMENTS

| | | | | | |
|---|---|---|---|---|---|
| CN | 101552060 | A | | 10/2009 | |
| CN | 102368439 | A | | 3/2012 | |
| CN | 104043834 | A | | 9/2014 | |
| CN | 105006326 | A | * | 10/2015 | |
| CN | 105006326 | A | | 10/2015 | |
| CN | 106548844 | A | | 3/2017 | |
| CN | 107424701 | A | * | 12/2017 | ........... B02C 19/068 |
| CN | 108364778 | A | | 8/2018 | |
| CN | 108922708 | A | * | 11/2018 | .............. B22F 9/023 |
| CN | 108922708 | A | | 11/2018 | |
| CN | 108922765 | A | | 11/2018 | |
| CN | 108922766 | A | | 11/2018 | |
| JP | H 0661021 | A | | 3/1994 | |
| JP | 2015154051 | A | | 8/2015 | |

* cited by examiner

*Primary Examiner* — Jenny R Wu
(74) *Attorney, Agent, or Firm* — MUNCY, GEISSLER, OLDS & LOWE, P.C.

(57) ABSTRACT

The present invention relates to a method for preparing a neodymium-iron-boron rare-earth permanent magnetic material, in particular to a hot press molding-based method for preparing a rare-earth permanent magnet. The problem that the residual magnetism and coercive force of a rare-earth permanent magnet prepared in the prior art cannot be both high is solved. An RTM alloy infiltrates same during an HD treatment. RTM sticks to the surface of coarse powder and infiltrates into the interior of the coarse powder along a grain boundary. The temperature of hot press sintering is relatively low, and grains barely grow. In the absence of Dy and Tb, a higher coercive force is obtained. If an alloy containing Dy and Tb is used for infiltration, these atoms diffuse into the surface layer of a main phase during pre-heating and heat treatment, achieving grain boundary hardening. Under the premise of a very small reduction in the residual magnetism, the coercive force is greatly improved.

9 Claims, No Drawings

METHOD FOR PREPARING RARE-EARTH PERMANENT MAGNET BY HOT PRESS MOLDING

The present application claims priority to Chinese Patent Application No. 201811471014.6 filed to the SIPO on Dec. 4, 2018 and entitled "METHOD FOR PREPARING RARE-EARTH PERMANENT MAGNET BY HOT PRESS MOLDING", the disclosure of which is incorporated herein by reference in its entirety.

TECHNICAL FIELD

The present invention relates to a method for preparing a neodymium-iron-boron rare-earth permanent magnetic material, in particular to a method for preparing a rare-earth permanent magnet by hot press molding.

BACKGROUND OF THE PRESENT INVENTION

Chinese Patent Application 201410094229.6 has disclosed a method for preparing a permanent magnetic material by hot pressing. In this method, a first material containing Nd, Fe and B in the form of core powder and a second material containing Dy and Tb in the form of metal alloy or in the form of surface powder are combined to form a coated composite-like material, which has a non-uniform distribution of Dy or Tb constituting the second material. Then, hot press molding is performed on the coated composite-like material. In the prior art or industrial production, it is impossible to coat a film in 1 nm to 10 nm onto the surfaces of particles in 1 μm to 5 μm. The provided coating schemes such as mechanical grinding, vortex coating, ion sputtering and high-pressure particle sputtering are difficult to implement in practice. It is described that a film in 1 μm to 100 μm is coated. The thickness of the film is already close to the size of the particles. Excessive rich phase will definitely reduce the performance of the material, even make it lower than the performance of the existing sintered magnet.

SUMMARY OF THE PRESENT INVENTION

To solve the above-mentioned deficiencies and problems in the prior art, the present invention provides a method for preparing a rare-earth permanent magnet by hot press molding.

The present invention is realized by the following technical solutions. A method for preparing a rare-earth permanent magnet by hot press molding is provided, including steps of:

1) smelting an RFeB alloy, where R is any one of Nd, Pr, Dy, Tb, Ce, La, Gd, Ho and Y, or any combination of two or more of Nd, Pr, Dy, Tb, Ce, La, Gd, Ho and Y, and the content of the rare-earth R in the RFeB alloy is 27.5% to 30.5% by mass; the RFeB alloy further contains 0.2% to 2% by mass of a metal composition; the metal composition is any one of Al, Cu, Ga, Zr and Nb, or any combination of two or more of Al, Cu, Ga, Zr and Nb in any ratio; and 1% to 10% Fe is replaced with Co;

2) performing HD treatment on the master alloy, and permeating an $R_TM$ alloy during this process, where $R_T$ is any one of Nd, Pr, Dy, Tb, Gd, Ho, Y and Sc, or any combination of two or more of Nd, Pr, Dy, Tb, Gd, Ho, Y and Sc in any ratio, and M is any one of Cu, Al and Ga, or any combination of two or more of Cu, Al and Ga in any ratio;

3) performing jet pulverization on the product obtained in the step 2);

4) molding under a magnetic field at room temperature;

5) preheating the green body in vacuum;

6) performing hot pressing on the green body to further improve the density; and 7) aging to obtain the magnet.

After the saturated hydrogen adsorption in the HD process, the temperature is raised to 750° C. to 950° C. for permeation, and $R_TM$ will adhere to the surface of powder and permeate into the alloy along a grain boundary.

During the subsequent jet pulverization, the product obtained in the step 2) is pulverized to 1 μm to 6 μm.

After a magnetic field orientation molding, the green body is fully preheated in vacuum at 650° C. to 950° C. The absorbed gas was discharged, and various organic additives and residual hydrogen are volatilized.

The preheated green body is immediately loaded into a mold having a temperature close to the preheating temperature, and a pressure of 25 to 120 MPa is applied for hot pressing. The density reaches 99.8% to 99.9% of the theoretical density. The melted rich phase squeezes into the gap under pressure, increasing the density.

At this temperature, grains barely grow and are maintained in a size after jet pulverization. If the infiltrated rare-earth element is different from the main phase, during preheating and aging treatment, the rare-earth element will partially diffuse into the surface layer of the main phase. If an element with a high anisotropic field such as Dy, Tb or Ho is used for permeation, the effect of hardening the grain boundary is achieved. The coercive force is greatly improved, while the residual magnetism is reduced less.

As an existing well-known technology, the hot press molding technology has been widely used in ceramics, cemented carbide or other fields. By combining the hot press molding technology with the existing neodymium-iron-boron technology, the coercive force can reach above 1350 KA/m without adding any heavy rate-earth element. By permeating a trace amount of elements with a high anisotropic field such as Dy, Tb and Ho, the coercive force can reach above 2388 KA/m.

Further, in the step 2), the permeation amount of the $R_TM$ alloy is 0.5% to 4.5% of the mass of the master alloy. The element and the amount for permeation are selected according to the requirements for the performance of the magnet. Thus, the performance of the magnetic material is ensured, the consumption of materials is optimized, and the cost is reduced.

Furthermore, the infiltration material is $R_TM$ alloy in the step 2), $R_T$ accounts for 65% to 100%, and M accounts for 0% to 35%. By adding metals Cu, Al and Ga, the wettability and fluidity of the liquid phase can be improved, and it is beneficial to reduce the pressure of hot pressing. The selection of rare-earth elements depends on the required performance of the magnet. For products requiring a coercive force below 1350 KA/m, Nd, Pr and Gd are selected. For products requiring a coercive force above 1350 KA/m, Dy, Tb and Ho elements should be selected.

The performance of the magnetic material obtained by the method of the present invention is greatly improved in comparison to the prior art. The amount of heavy rare-earth elements is reduced or completely saved.

DETAILED DESCRIPTION OF THE PRESENT INVENTION

A method for preparing a rare-earth permanent magnet by hot press molding is provided, including steps of:

1) smelting an RFeB alloy, where R is any one of Nd, Pr, Dy, Tb, Ce, La, Gd, Ho and Y, or any combination of two or more of Nd, Pr, Dy, Tb, Ce, La, Gd, Ho and Y, and the content of the rare-earth R in the RFeB alloy is 27.5% to 30.5% (e.g., optionally 27.5%, 28%, 28.5%, 29% or 30.5%) by mass; the RFeB alloy further contains 0.2% to 2% (e.g., optionally 0.2%, 0.5%, 0.8%, 1.0%, 1.5% or 2%) by mass of a metal composition; the metal composition is any one of Al, Cu, Ga, Zr and Nb, or any combination of two or more of Al, Cu, Ga, Zr and Nb in any ratio; and 1% to 10% Fe is replaced with Co;

2) performing HD treatment on the master alloy, and permeating an $R_T$M alloy during this process, where $R_T$ is any one of Nd, Pr, Dy, Tb, Gd, Ho, Y and Sc, or any combination of two or more of Nd, Pr, Dy, Tb, Gd, Ho, Y and Sc in any ratio, and M is any one of Cu, Al and Ga, or any combination of two or more of Cu, Al and Ga in any ratio;

3) performing jet pulverization on the product obtained in the step 2);

4) molding under a magnetic field at room temperature;

5) preheating the green body in vacuum;

6) performing hot pressing on the green body to further improve the density; and 7) aging to obtain the magnet.

In the step 2), the permeation amount of the $R_T$M alloy is 0.5% to 4.5% (e.g., optionally 0.5%, 1%, 2%, 3%, 3.5%, 4% or 4.5%) of the mass of the RFeB alloy.

In the $R_T$M alloy in the step 2), $R_T$ accounts for 65% to 100%, and M accounts for 0% to 35% (e.g., optionally, $R_T$ accounts for 65% and M accounts for 35%; $R_T$ accounts for 100% and M accounts for 0%; $R_T$ accounts for 75% and M accounts for 25%; $R_T$ accounts for 85% and M accounts for 15%; or, $R_T$ accounts for 95% and M accounts for 5%).

The $R_T$M alloy may be replaced with an $R_T$FeB alloy. $R_T$ is any one of Nd, Pr, Dy, Tb, Gd, Ho, Y and Sc, or any combination of two or more of Nd, Pr, Dy, Tb, Gd, Ho, Y and Sc in any ratio, and the content of $R_T$ exceeds 50% of the mass of the $R_T$FeB alloy.

In the step 1), the RFeB alloy is obtained by smelting RFeB alloy quick-setting sheets in which the content of rare-earth R is 27.5% to 30.5% by mass.

In the step 2), the HD treatment process includes steps of:

a) mixing the $R_T$M alloy powder in 1 μm to 100 μm with a quick-setting sheet alloy and loading the mixture into an HD treatment furnace;

b) filling with hydrogen after the vacuum degree reaches 0.1 Pa, maintaining the pressure at 0.05 MPa to 0.2 MPa (e.g., optionally 0.05 MPa, 0.1 MPa, 0.15 MPa or 0.2 MPa), and performing saturated hydrogen absorption;

c) permeating and dehydrogenating for 60 min to 240 min (e.g., optionally 60 min, 120 min, 180 min or 240 min) at 750° C. to 950° C. (e.g., optionally 750° C., 800° C., 850° C., 900° C. or 950° C.);

d) stopping heating, cooling to 200° C., and performing secondary hydrogen absorption, where the hydrogen absorption amount is 500 to 1000 ppm (e.g., optionally 500 ppm, 600 ppm, 700 ppm, 800 ppm, 900 ppm or 1000 ppm); and e) feeding Ar, cooling with water to room temperature, sealing and taking out from the furnace.

During the jet pulverization in the step 3), compressed $N_2$ is used as power, and grinding is performed until the average particle size is 1 μm to 6 μm (e.g., optionally 1 μm, 2 μm, 3 μm, 4 μm, 5 μm or 6 μm).

In the step 4), molding is performed under a magnetic field at room temperature. Pressing is performed under an orientation magnetic field with an intensity greater than 1.2 T. The density is 3.6 to 4.2 g/cm$^2$, and the exposed space has an oxygen concentration less than 500 PPM. To further improve the density, it is possible to perform secondary molding, i.e., isostatic pressing. The pressure for isostatic pressing is 150 MPa to 300 MPa (e.g., optionally 150 MPa, 210 MPa, 250 MPa or 300 MPa).

During the preheating in the step 5), preheating is performed for 1 h to 10 h (e.g., optionally 1 h, 2 h, 3 h, 4 h, 5 h, 6 h, 7 h, 8 h, 9 h or 10 h) at 650° C. to 950° C. (e.g., optionally 650° C., 700° C., 800° C., 900° C. or 950° C.).

In the step 6), at the end of preheating, the green body is immediately loaded into a mold cavity having a temperature close to the preheating temperature, and a pressure of 25 to 120 MPa (e.g., optionally 25 MPa, 40 MPa, 50 MPa, 60 MPa, 90 MPa or 120 MPa) is applied and maintained for 0.3 min to 10 min (e.g., optionally 0.3 min, 0.5 min, 0.8 min, 1 min, 3 min, 5 min, 6 min, 8 min, 9 min or 10 min). Hot pressing is performed in an inert gas having an oxygen content less than 200 PPM, and the pressure is 0 MPa, that is, there is no pressure difference between the inert gas and the outside. The green body is naturally or forcedly cooled to the room temperature.

The cross-section size of the hot pressing mold in the step 6) is increased by 0.05 mm to 0.2 mm according to the size of the preheated green body after shrinkage, so as to facilitate molding.

In the step 7), the hot-pressed product may be aged at an aging temperature of 450° C. to 950° C. (e.g., optionally 450° C., 500° C., 600° C., 700° C., 800° C., 900° C. or 950° C.).

Embodiment 1

The material formulation of the RFeB alloy was as follows:

| Composition | Nd + Pr | Co | B | Cu | Nb | Al | Zr | Ga | Fe |
|---|---|---|---|---|---|---|---|---|---|
| Mass ratio | 27.8 | 0.9 | 1.05 | 0.2 | 0.2 | 0.2 | 0.1 | 0.1 | The remaining |

The materials were smelted in vacuum according to the formulation, and treated by quick-setting spinning to obtain the RFeB alloy, i.e., quick-setting sheets, having a thickness of 0.20 mm to 0.45 mm.

The quick-setting sheets were processed by the method of the present application. The $R_T$M alloy infiltrated during the HD process was DyCu alloy powder, where Nd accounted for 90% and Cu accounted for 10%.

To ensure the performance, it was required that there was no oxide layer on the surfaces of the quick-setting sheets and the discharging of the quick-setting furnace was performed in a sealed barrel. When loaded into a hydrogen pulverizating furnace, the quick-setting sheets should be strictly protected from contact with air.

The quick-setting sheets and the DyCu alloy powder in an amount that was 1% of the total mass of the quick-setting sheets were loaded into a treatment furnace. After the vacuum degree reached 0.1 Pa, saturated hydrogen absorption was performed at a hydrogen pressure of 0.05 MPa to 0.2 MPa. Subsequently, dehydrogenation was performed for 120 min at 900° C. Then, heating was stopped, and the vacuum state was maintained. Cooled to 200° C. and subjected to secondary hydrogen absorption in a hydrogen absorption amount of 800 ppm, and then cooled, sealed and discharged. The jet pulverization was performed until the average particle size was 2 μm to 4 μm.

The experimental mold was 25*50 mm in size, and the mold cavity was 150 mm in depth. Molding was performed under a magnetic field in a low-oxygen environment having an oxygen concentration less than 500 ppm, 525 g of magnetic powder was added, a pressure of 15 Ton was applied, to obtain a green body in 25*50*50. The green body was preheated in vacuum at a vacuum degree of 0.01 Pa and at 900° C., then placed into the mold cavity, and maintained for 60 s at 40 MPa to realize a density of 7.6 g/cm$^2$. Cooled and aged at 900° C. to obtain the product with magnetic performance 55 H. The residual magnetism was 14.5 KGs, and the HcJ was 1350 KA/m.

Embodiment 2

The material formulation of the RFeB alloy was as follows:

| Composition | Nd + Pr | Co | B | Cu | Nb | Al | Zr | Ga | Fe |
|---|---|---|---|---|---|---|---|---|---|
| Mass ratio | 27.8 | 0.9 | 1.05 | 0.2 | 0.2 | 0.2 | 0.1 | 0.1 | The remaining |

The materials were smelted in vacuum according to the formulation, and treated by quick-setting spinning to obtain the RFeB alloy, i.e., quick-setting sheets, having a thickness of 0.20 mm to 0.45 mm.

A TbCuAl alloy and powder thereof were prepared, where Tb accounted for 80%, Cu accounted for 10%, and Al accounted for 10% (mass percentage).

The same implementation method as Embodiment 1 was executed. During this process, part of TbCuAl adhered to the surfaces of coarse particles subjected to hydrogen pulverizating, while part of TbCuAl diffused into coarse powder.

Jet pulverization, molding under a magnetic field, vacuum preheating, hot pressing and tempering were performed by methods the same as those in Embodiment 1. The product with magnetic performance 50 EH was obtained. The residual magnetism was 14.0 KGs, and the HcJ was 2388 KA/m.

The invention claimed is:

1. A method for preparing a rare-earth permanent magnet by hot press molding, comprising steps of:

1) smelting an RFeB alloy, where R is any one of Nd, Pr, Dy, Tb, Ce, La, Gd, Ho and Y, or any combination of two or more of Nd, Pr, Dy, Tb, Ce, La, Gd, Ho and Y, and the content of the rare-earth R in the RFeB alloy is 27.5% to 30.5% by mass; the RFeB alloy further contains 0.2% to 2% by mass of a metal composition; the metal composition is any one of Al, Cu, Ga, Zr and Nb, or any combination of two or more of Al, Cu, Ga, Zr and Nb in any ratio; and 1% to 10% Fe is replaced with Co;
2) performing hydrogen decrepitation (HD) treatment on the RFeB alloy, and permeating an $R_TM$ alloy during the HD treatment, where $R_T$ is any one of Nd, Pr, Dy, Tb, Gd, Ho, Y and Sc, or any combination of two or more of Nd, Pr, Dy, Tb, Gd, Ho, Y and Sc in any ratio, and M is any one of Cu, Al and Ga, or any combination of two or more of Cu, Al and Ga in any ratio;
3) performing jet pulverization on the product obtained in the step 2);
4) molding under a magnetic field at room temperature to obtain a green body;
5) preheating the green body in vacuum for 1 h to 10 h at 650° C. to 950° C. and at a vacuum degree of $10^{-1}$ to $10^{-4}$ Pa;
6) performing hot pressing on the green body comprising: immediately loading the green body into a mold cavity of a hot pressing mold having a temperature close to a preheating temperature at an end of preheating, applying a pressure of 25 to 120 Mpa, maintaining the pressure for 0.3 min to 10 min, hot pressing the green body in an inert gas having an oxygen content less than 200 PPM, naturally or forcedly cooling to the room temperature; and
7) aging to obtain the magnet.

2. The method for preparing a rare-earth permanent magnet by hot press molding according to claim 1, wherein in the $R_TM$ alloy in the step 2), $R_T$ accounts for 65% to 100% by mass, and M accounts for 0% to 35% by mass.

3. The method for preparing a rare-earth permanent magnet by hot press molding according to claim 1, wherein in the step 2), a permeation amount of the $R_TM$ alloy is 0.5% to 4.5% of the mass of the RFeB alloy.

4. The method for preparing a rare-earth permanent magnet by hot press molding according to claim 1, wherein in the step 2), the HD treatment process comprises steps of:

a) mixing a powder of the $R_TM$ alloy in 1 μm to 100 μm with the RFeB alloy and loading the mixture into an HD treatment furnace;
b) filling with hydrogen after a vacuum degree in the HD treatment furnace reaches 0.1 Pa, maintaining a pressure in the HD treatment furnace at 0.05 MPa to 0.2 MPa, and performing saturated hydrogen absorption;
c) permeating and dehydrogenating for 60 min to 240 min at 750° C. to 950° C.;
d) stopping heating; and
e) cooling, then sealing and taking out from the furnace.

5. The method for preparing a rare-earth permanent magnet by hot press molding according to claim 1, wherein during the jet pulverization in the step 3), compressed $N_2$ is used as power, and pulverizing is performed until an average particle size is 1 μm to 6 μm.

6. The method for preparing a rare-earth permanent magnet by hot press molding according to claim 1, wherein in the step 4), pressing is performed under an orientation magnetic field with an intensity greater than 1.2 T and is performed in a low-oxygen environment, the pressing density is 3.6 to 4.2 g/cm$^3$, and an oxygen concentration in the low-oxygen environment is less than 500 PPM.

7. The method for preparing a rare-earth permanent magnet by hot press molding according to claim 1, wherein the $R_TM$ alloy is replaced with an $R_TFeB$ alloy, where $R_T$ is any one of Nd, Pr, Dy, Tb, Gd, Ho, Y and Sc, or any combination of two or more of Nd, Pr, Dy, Tb, Gd, Ho, Y and Sc in any ratio, and a content of $R_T$ exceeds 50% of a mass of the $R_TFeB$ alloy.

8. The method for preparing a rare-earth permanent magnet by hot press molding according to claim 1, wherein the hot-pressed product is aged at an aging temperature of 450° C. to 950° C.

9. A method for preparing a rare-earth permanent magnet by hot press molding, comprising:

1) smelting an RFeB alloy, where R is any one of Nd, Pr, Dy, Tb, Ce, La, Gd, Ho and Y, or any combination of two or more of Nd, Pr, Dy, Tb, Ce, La, Gd, Ho and Y, and the content of the rare-earth R in the RFeB alloy is 27.5% to 30.5% by mass; the RFeB alloy further contains 0.2% to 2% by mass of a metal composition; the metal composition is any one of Al, Cu, Ga, Zr and Nb, or any combination of two or more of Al, Cu, Ga, Zr and Nb in any ratio; and 1% to 10% Fe is replaced with Co;

2) performing hydrogen decrepitation (HD) treatment on the RFeB alloy, and permeating an $R_TM$ alloy during this process, where $R_T$ is any one of Nd, Pr, Dy, Tb, Gd, Ho, Y and Sc, or any combination of two or more of Nd, Pr, Dy, Tb, Gd, Ho, Y and Sc in any ratio, and M is any one of Cu, Al and Ga, or any combination of two or more of Cu, Al and Ga in any ratio;

3) performing jet pulverization on the product obtained in the step 2);

4) molding under a magnetic field at room temperature to obtain a green body;

5) preheating the green body in vacuum;

6) performing hot pressing on the green body, comprising immediately loading the green body into a mold cavity of a hot pressing mold having a temperature close to a preheating temperature at an end of preheating;

wherein a cross-section size of the hot pressing mold in the step 6) is increased by 0.05 mm to 0.2 mm according to a size of the preheated green body after shrinkage, so as to facilitate molding; and 7) aging to obtain the magnet.

* * * * *